(12) United States Patent
Huang et al.

(10) Patent No.: US 7,301,281 B2
(45) Date of Patent: Nov. 27, 2007

(54) CLAMP STRUCTURE OF AN EXTERNAL ELECTRODE LAMP

(75) Inventors: Chi-Jen Huang, Tai-Chung (TW); Hsin Chieh Lai, Hsin-Chu (TW)

(73) Assignee: HannStar Display Corp., Yang-Mei, Tao-Yuan Hsien (TW)

( * ) Notice: Subject to any disclaimer, the term of this patent is extended or adjusted under 35 U.S.C. 154(b) by 513 days.

(21) Appl. No.: 10/711,257

(22) Filed: Sep. 5, 2004

(65) Prior Publication Data

US 2006/0006803 A1     Jan. 12, 2006

(30) Foreign Application Priority Data

Jul. 8, 2004    (TW)  .............................. 93120462 A

(51) Int. Cl.
*H01J 11/00*     (2006.01)

(52) U.S. Cl. .................. 313/607; 313/234; 313/594

(58) Field of Classification Search ................ 313/607, 313/234, 594

See application file for complete search history.

(56) References Cited

U.S. PATENT DOCUMENTS

2003/0021114 A1\*   1/2003   Moon et al. ................ 362/235
2003/0035283 A1    2/2003   Lim

FOREIGN PATENT DOCUMENTS

JP          P2003-92004 A     3/2003

\* cited by examiner

*Primary Examiner*—Joseph Williams
*Assistant Examiner*—Bumsuk Won
(74) *Attorney, Agent, or Firm*—Winston Hsu

(57) ABSTRACT

A clamp structure of an external electrode lamp includes a first fixing device, a second fixing device, and a metal strip. The first fixing device has a first indentation and the second fixing device has a second indentation for clamping an electrode of the external electrode lamp. In addition, the metal strip is located between the first and second fixing devices to contact the electrode of the external electrode lamp for providing power. The electrode can be further equipped with a cushion for fixing the electrode onto the first and second fixing devices.

12 Claims, 3 Drawing Sheets

CLAMP STRUCTURE OF AN EXTERNAL ELECTRODE LAMP

BACKGROUND OF INVENTION

1. Field of the Invention

The invention relates to a clamp structure, and more particularly, to a clamp structure of an external electrode lamp.

2. Description of the Prior Art

Most lamps used in TFT-LCD backlight modules today are cold cathode fluorescent lamps (CCFL) and the electrodes of these lamps are essentially sealed inside the lamp. The electrode however, also contains a conducting end that extends from the internal electrode to an external conducting wire, and eventually connects to a power supply to light the lamp.

The conducting end of the CCFL essentially needs to be connected via welding or a copper belt to the conducting wire. Nevertheless, welding or copper belting are both complicated processes that also bear high failure rates. For example, poor soldering often causes a so-called fake welding effect, in which the heat generated during lighting will produce temperature high enough to melt the solder of the section where the conducting end is connected to the conducting wire and eventually results in a broken circuit. If the excess solder of the section between the conducting end and the conducting wire is poor, an electric discharge often results and causes serious scorch or electric leakage. On the other hand, if copper belting is used, electric discharge at the four corners of the copper belt has to be considered carefully, and in general, an additional insulated heat-shrink tube is added to cover the external area of the copper belt which unavoidably results in extra cost.

Taiwan Patent No. 00540745 provides a backlight device that includes a set of lamps located inside a main structure in which each of the lamps contains a conducting end that extends from the internal lamp. The main structure includes a plurality of supporting devices in which each of the devices contains a hole that is capable of holding a lamp and one conducting part that connects mechanically as well as electrically to the conducting end of the lamp. Despite the fact that this patent design could essentially solve the problems discussed previously, the luminosity and life expectancy of the lamp have been strongly challenged as the development of backlight lamp advances and as the size of LCD panel increases. In order to cope with these challenges, the external electrode fluorescent lamp (EEFL) has been introduced to the market.

The EEFL is a type of illuminating device for transforming electrical energy released via high frequencies into light energy. In contrast to other fluorescent lamp that uses the electrode to transform external electrical energy to the energy needed by the lamp, the EEFL utilizes the principle of electromagnetic induction and a pair of metal electrodes covering the lamp to generate an induced current internally. The pair of metal electrodes covering the lamp is essentially being used as a primary coil of an adapter whereas the lamp is being used as a secondary coil of an adapter.

Under the same electrical current, the luminosity of the light produced by the external electrode lamp is essentially higher than that produced by the cold cathode fluorescent lamp. As a result of rapid advancement in the EEFL and its inverter manufacture technology, the external electrode lamps have been gradually adopted into the TFT-LCD backlight modules. Moreover, the life expectancy of external electrode lamps is also significantly longer than cold cathode fluorescent lamps in that CCFL generally lasts 60,000 hours whereas the EEFL is able to last 80,000 to 100,000 hours.

Despite the fact that the EEFL in general exhibits greater efficiency over CCFL, it still has some disadvantages. During regular testing, as the electrode of the EEFL is constantly driven by high voltages and exposed to the outside environment, numerous electric shocks would frequently take place. In addition, the layout of the electrode power supply resulting from stabilizing the external electrode lamp in position also places various limitations on the shock resistance design. Consequently, many of the EEFL products sold in the market today still suffer from problems such as poor electrode cladding or poor shock resistance.

SUMMARY OF INVENTION

It is therefore an object of the claimed invention to provide a clamp structure of an external electrode lamp with excellent wrapping and cushioning capability to solve the problems stated previously.

According to the claimed invention, the clamp structure of the external electrode lamp includes a first fixing device, a second fixing device, and a metal strip. The first fixing device includes at least a first indentation and the second fixing device includes at least a second indentation for clamping an electrode of the external electrode lamp. In addition, the metal strip is located between the first and second fixing devices to contact the electrode of the external electrode lamp for providing power. The electrode can be further equipped with a cushion for fixing the electrode onto the first and second fixing devices.

According to the claimed invention, the clamp structure is applicable in a backlight module, which includes an external electrode lamp, an inverter, and the clamp structure wherein the inverter is used for providing power to the external electrode lamp and the clamp structure is for holding the external electrode lamp. The clamp structure includes a first fixing device, a second fixing device, and a metal strip. The first fixing device includes at least a first indentation and the second fixing device includes at least a second indentation for clamping an electrode of the external electrode lamp. In addition, the metal strip is located between the first and second fixing devices to contact the electrode of the external electrode lamp for providing power. The electrode can be further equipped with a cushion for fixing the electrode onto the first and second fixing devices.

It is an advantage of the present invention that the clamp structure provides distinguishing features including well adapted cladding ability and strong resistance to shocks and impacts, thereby effectively increasing the safety and reliability of the product.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
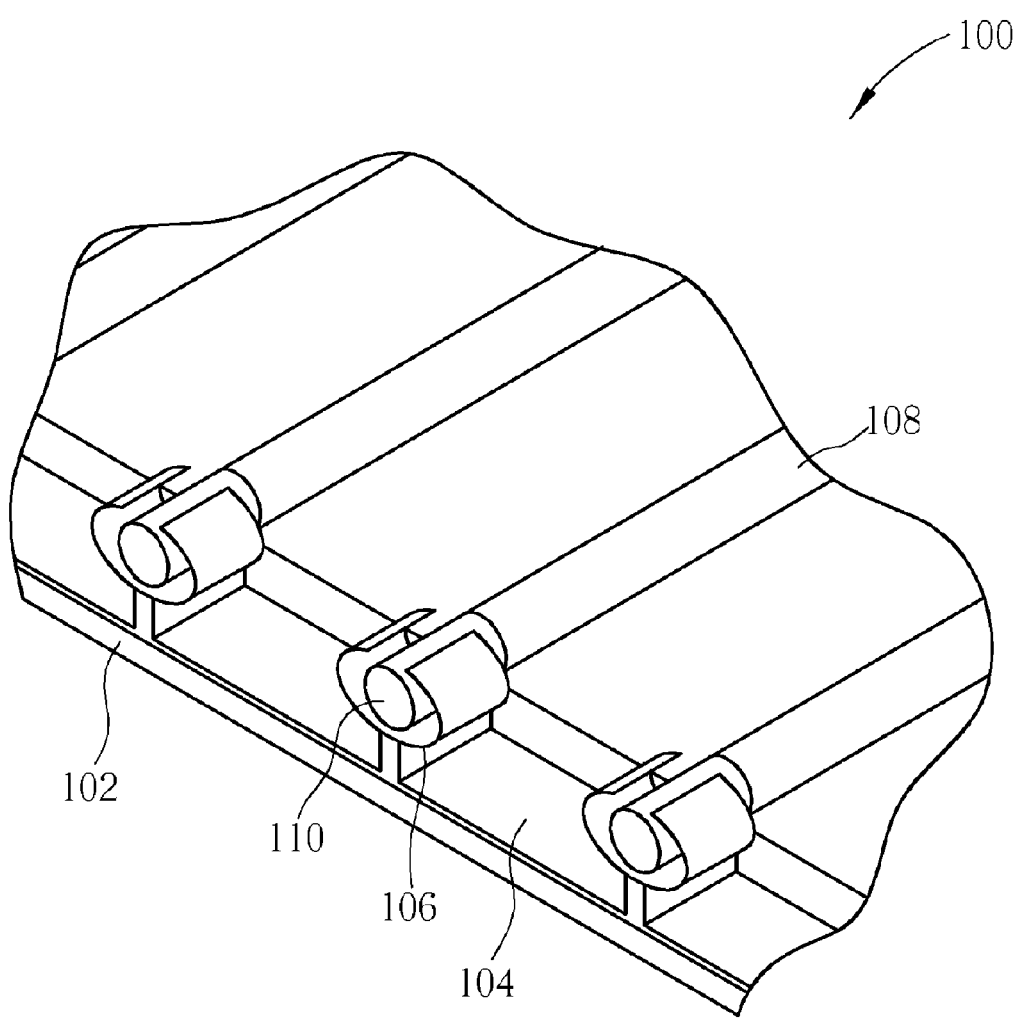
FIG. 1 is a diagram illustrating a clamp structure of an external electrode lamp according to the present invention.

Please refer to FIG. 1. FIG. 1 is a diagram of a clamp structure of an external electrode lamp according to the present invention. As shown in FIG. 1, a clamp structure 100 includes a base 102, a metal strip 104, and a row of metal clipping channel 106. The entire row of metal clipping channel 106 is fixed in place by the metal strip 104 and when an external electrode lamp 108 is installed into the clamp structure 100, a parallel connection will be established. The connection between the external electrode lamp 108 and the clamping structure 100 is essentially achieved by installing and clamping the electrode 110 of the external electrode lamp 108 into the metal clipping channel 106 via its metal elasticity. The metal strip 104 is then electrically connected to an inverter (not shown) for providing power from the inverter to each metal clipping channel 106. By contacting the external electrode lamp 108 with the metal clipping channel 106 directly, the power can be delivered smoothly from the metal strip 104 to the external electrode lamp 108 to form a complete parallel circuit.

Figure 2:
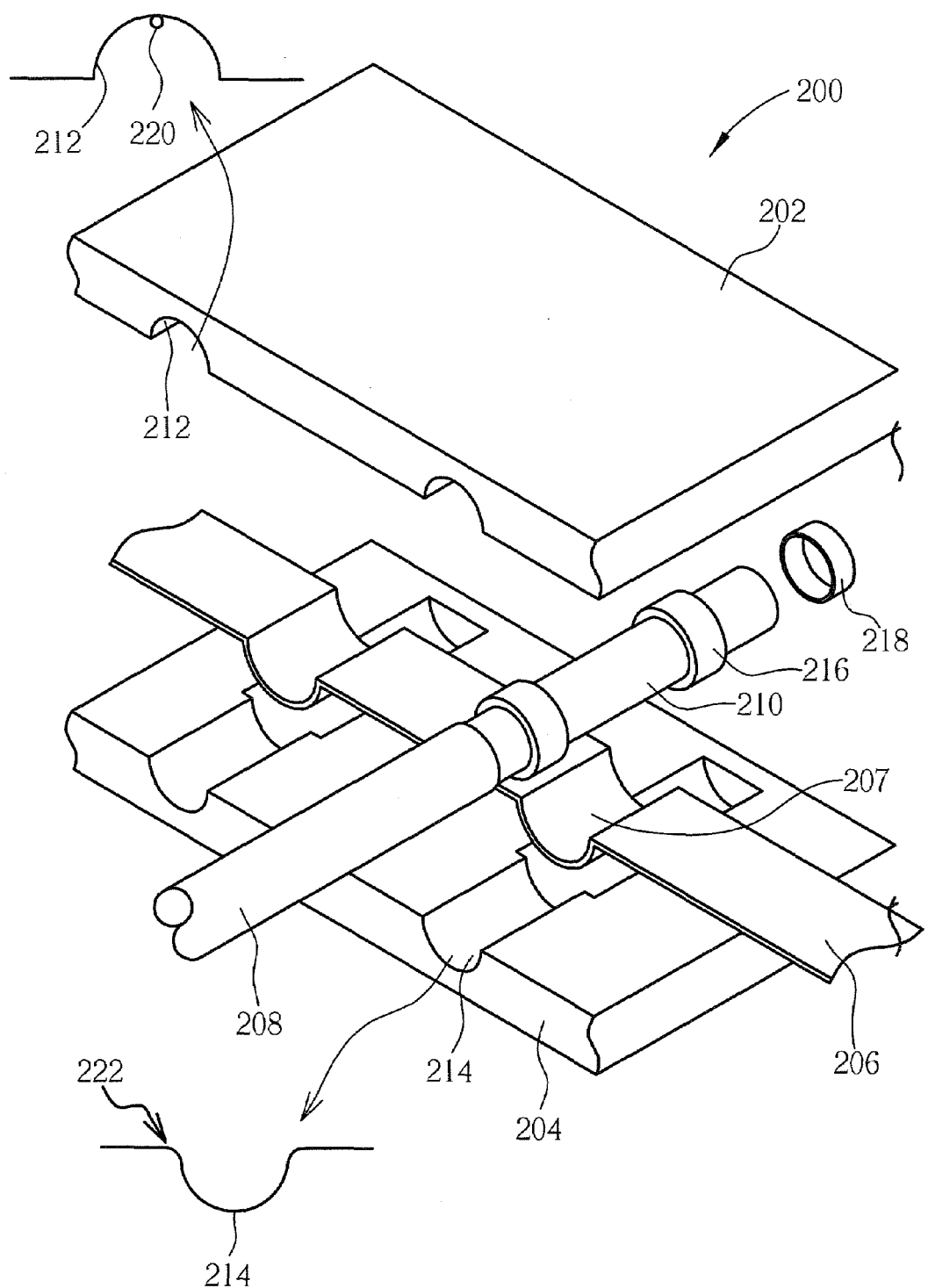
FIG. 2 is a diagram illustrating a clamp structure of an external electrode lamp according to another embodiment of the present invention.

Please refer to FIG. 2. FIG. 2 is a diagram of a clamp structure of an external electrode lamp according to another embodiment of the present invention. As shown in FIG. 2, a clamp structure 200 includes a first fixing device 202, a second fixing device 204, and a metal strip 206, wherein the first fixing device 202 further includes a plurality of first indentations 212 and the second fixing device 204 further includes a plurality of second indentations 214. The first indentation 212 and the second indentation 214 are used for clamping an external electrode 210 of an external electrode lamp 208. In addition, the metal strip 206, located between the first fixing device 202 and the second fixing device 204, includes an electrical junction 207 that is electrically connected to the external electrode 210 of the external electrode lamp 208 for providing power. During usage, the metal strip 206 is positioned on the first fixing device 202 or the second fixing device 204 and the external electrode 210 of external electrode lamp 208 is placed on the metal strip 206. The metal strip 206 is then connected to an inverter (not shown) for providing power to the external electrode 210.

The first fixing device 202 and the second fixing device 204 can be made of plastic or other insulating materials such as bakelite. The metal strip 206 can be either bent according to the shape of the second indentation 214, as is shown in FIG. 2, or bent according to the shape of the first indentation 212, to form the electrical junction 207, so that the metal strip 206 can be tightly connected to each of the indentations 212, 214. Essentially, the bending radius or curvature of the electrical junction 207 needs to be slightly less than the radius or curvature of the first indentation 212 or the second indentation 214. In addition, a protruding structure 220 can be added on the first indentation 212 or the second indentation 214 SO that when the clamp structure 200 is assembled, the metal strip 206 is connected much more tightly with the external electrode 210. In order to enhance the installation of the metal strip 206 into the first indentation 212 or the second indentation 214 more easily, a bevel 222 can be added on the first indentation 212 or the second indentation 214. When the metal strip 206 is placed into the first indentation 212 or the second indentation 214, accessories such as screws or tenons are used to fix the metal strip 206 in place.

In order to increase the shock resistance of the external electrode lamp 208 and the clamp structure 200, a cushion 216 is added around the external electrode lamp 208 during assembly. Positioned between the external electrode 210 and the first fixing device 202 or the second fixing device 204, the cushion 216 can be made of rubber or other shock-absorbing materials with strong elasticity.

When the external electrode lamp 208 is assembled onto the clamp structure 200, the external electrode 210 is able to prevent shakes from the clamp structure 200 from damaging the external electrode lamp 208 by contacting the cushion 216 with the first fixing device 202 or the second fixing device 204. In addition, the cushion 216 also provides a fitting function in the horizontal direction to prevent the external electrode lamp 208 from sliding on the first indentation 212 or the second indentation 214. In effect, a better design of the cushion area could include an expansion area to the space where the first indentation 212 or the second indentation 214 corresponds to the cushion 216 or a tip section 218 of the extremity of the external electrode 210. More notably, the tip section 218 can be made of elastic materials such as plastic or sponges that are capable of enhancing the ability of shock absorbance and impact resistance. Moreover, the tip section 218 can be made in various shapes like caps, circles, or flakes according to each product specification. When the external electrode lamp 208 is put in place into the clamp structure 200, the first fixing device 202 and the second fixing device 204 can be fixed in position via screws or tenons.

Figure 3:
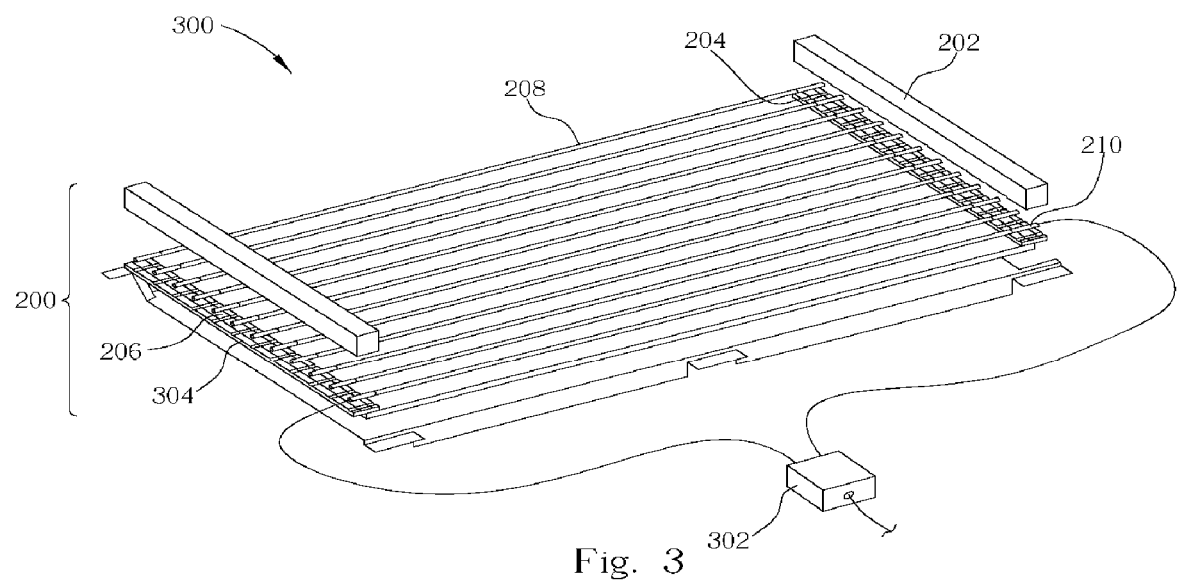
FIG. 3 is a diagram illustrating a backlight module according to the present invention.

Please refer to FIG. 3. FIG. 3 is a diagram of a backlight module according to the present invention. As shown in FIG. 3, a backlight module 300 includes a combined structure of the clamp structure 200 and the external electrode lamp 208 stated previously and an inverter 302. By completely covering the external electrode 210 with the first fixing device 202 and the second fixing device 204, the backlight module 300 is able develop a well adapted electrode cladding ability to prevent electric shocks. In addition, the backlight module 300 also provides good shock absorbance and impact resistance by contacting the external electrode 210 with the first fixing device 202 or the second fixing device 204 via the cushion 216. The installation of the external electrode 210 of the external electrode lamp 208 into the clamp structure 200 is essentially established by clamping the external electrode 210 with the first fixing device 202 and the second fixing device 204. The metal strip 206 on the other hand, is electrically connected to the inverter 302 for providing power from the inverter 302 to each external electrode 210. By contacting the external electrode 210 of the external electrode lamp 208 with the metal strip 206 directly, power can be delivered smoothly to the external electrode lamp 208 to form a complete parallel circuit. A backboard 304 capable of reflecting light is also added underneath the backlight module 300 to direct the light sent out by the backlight module 300 to the upper direction.

In contrast to the prior art, the present invention introduces the clamp structure of the external electrode lamp to provide distinguishing features including well adapted cladding ability and strong resistance to shocks and impacts, thereby effectively increasing the safety and reliability of the product.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight module, comprising:
   an external electrode lamp having an external electrode;
   an inverter for providing power to the external electrode lamp; and
   a clamp structure for clamping the external electrode, comprising:
   a first fixing device comprising a first indentation;
   a second fixing device comprising a second indentation wherein the first and second indentations are used for clamping the external electrode of the external electrode lamp;
   a metal strip, connected to the inverter and located between the first and second fixing devices, comprising an electrical junction that is connected to the external electrode for providing power to the external electrode lamp; and
   a cushion having a closed ring surrounding the external electrode of the external electrode lamp and disposed outside the electrical junction, wherein one surface of the electrical junction is adjacent to the first fixing device and the other surface of the electrical junction is adjacent to the external electrode.

2. The backlight module of claim 1, wherein the metal strip is located between the first indentation of the first fixing device and the external electrode of the external electrode lamp.

3. The backlight module of claim 1, wherein the metal strip is adjacent to the second indentation of the second fixing device.

4. A clamp structure of an external electrode lamp, comprising:
   a first fixing device comprising a first indentation;
   a second fixing device comprising a second indentation wherein the first and second indentations are used for clamping an external electrode of the external electrode lamp;
   a metal strip, connected to the inverter and located between the first and second fixing devices, comprising an electrical junction that is connected to the external electrode for providing power to the external electrode lamp; and
   a cushion having a closed ring surrounding the external electrode of the external electrode lamp and disposed outside the electrical junction, wherein one surface of the electrical junction is adjacent to the first fixing device and the other surface of the electrical junction is adjacent to the external electrode.

5. The clamp structure of an external electrode lamp of claim 4, wherein the metal strip is located between the first indentation of the first fixing device and the external electrode of the external electrode lamp.

6. The clamp structure of an external electrode lamp of claim 5, wherein the electrical junction of the metal strip corresponds to the first indentation of the first fixing device.

7. The clamp structure of an external electrode lamp of claim 5, wherein the first indentation further comprises a first bevel for the convenience of the overall metal strip layout.

8. The clamp structure of an external electrode lamp of claim 4, wherein the second indentation of the second fixing device further comprises a second protruding structure, in which the structure is physically in contact with the external electrode of the external electrode lamp.

9. The clamp structure of an external electrode lamp of claim 4, wherein the metal strip is located between the second indentation of the second fixing device and the external electrode of the external electrode lamp.

10. The clamp structure of an external electrode lamp of claim 9, wherein the electrical junction of the metal strip corresponds to the second indentation of the second fixing device.

11. The clamp structure of an external electrode lamp of claim 9, wherein the second indentation further comprises a second bevel for the convenience of the overall metal strip layout.

12. The clamp structure of an external electrode lamp of claim 4, wherein the first indentation of the first fixing device further comprises a first protruding structure, in which the structure is physically in contact with the external electrode of the external electrode lamp.

* * * * *